United States Patent
Wu

(10) Patent No.: US 9,444,915 B2
(45) Date of Patent: Sep. 13, 2016

(54) METHOD AND DEVICE FOR MODIFYING AND FORWARDING MESSAGE IN DATA COMMUNICATION NETWORK

(71) Applicant: ZTE Corporation, Shenzhen, Guangdong (CN)

(72) Inventor: Kun Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/436,307

(22) PCT Filed: Sep. 22, 2013

(86) PCT No.: PCT/CN2013/083941
§ 371 (c)(1),
(2) Date: Apr. 16, 2015

(87) PCT Pub. No.: WO2014/059853
PCT Pub. Date: Apr. 24, 2014

(65) Prior Publication Data
US 2015/0319271 A1    Nov. 5, 2015

(30) Foreign Application Priority Data

Oct. 18, 2012   (CN) .......................... 2012 1 0397850

(51) Int. Cl.
*H04L 29/06*     (2006.01)
*H04L 12/741*    (2013.01)

(52) U.S. Cl.
CPC ............ *H04L 69/22* (2013.01); *H04L 45/745* (2013.01)

(58) Field of Classification Search
CPC ... H04L 69/22; H04L 69/08; H04L 12/4633; H04L 45/74; H04L 67/2823; H04W 72/005; H04W 4/18; H04W 28/06; H04W 28/065
See application file for complete search history.

(56) References Cited

U.S. PATENT DOCUMENTS 6,453,360 B1    9/2002 Muller
2003/0026260 A1*  2/2003 Ogasawara ......... H04L 12/4633
370/392

(Continued)

FOREIGN PATENT DOCUMENTS

CN         1713637 A      12/2005
CN       101252523 A       8/2008

(Continued)

OTHER PUBLICATIONS

International Search Report in international application No. PCT/CN2013/083941, mailed on Nov. 21, 2013.

(Continued)

*Primary Examiner* — Jung Park
(74) *Attorney, Agent, or Firm* — Oppedahl Patent Law Firm LLC

(57) ABSTRACT

A method and a device for modifying and forwarding a message in a data communication network are described. The method includes: description information of a message head is extracted as message descriptor information, and message fragments except the message descriptor information are stored; a pre-stored message modification description table is searched for modification parameters used for a message modification according to the message descriptor information; a needed message modification action is determined according to the obtained modification parameters, and the message fragments with a requirement of modification are modified in groups according to the types of actions; and the message fragments are distributed and reassembled according to port numbers, the message fragments are re-spliced into a complete message, and the message is sent to an external interface in time sequence. By modifying a pre-stored message modification description table through an external interface to add, alter or delete message modification parameters, the method and the device provided herein meet the demands for different kinds of services, greatly decrease the workload of design and reduce maintenance time, cost and complexity.

9 Claims, 2 Drawing Sheets

(56) References Cited

U.S. PATENT DOCUMENTS

| | | |
|---|---|---|
| 2006/0268819 A1 | 11/2006 | Chen |
| 2007/0195761 A1* | 8/2007 | Tatar .................. H04L 49/1546 370/389 |
| 2009/0240874 A1* | 9/2009 | Pong .................. G06F 12/0223 711/105 |
| 2013/0089095 A1 | 4/2013 | Chen |

FOREIGN PATENT DOCUMENTS

| | | |
|---|---|---|
| CN | 101567854 A | 10/2009 |
| JP | 2000349816 A | 12/2000 |
| JP | 2002538733 A | 11/2002 |
| JP | 2004064648 A | 2/2004 |
| RU | 2189072 C2 | 9/2002 |
| WO | 0052904 A1 | 9/2000 |

OTHER PUBLICATIONS

English Translation of the Written Opinion of the International Search Authority in international application No. PCT/CN2013/083941, mailed on Nov. 21, 2013.

Supplementary European Search Report in European application No. 13847057.0, mailed on Sep. 15, 2015.

* cited by examiner (a)

(b)

(c)

METHOD AND DEVICE FOR MODIFYING AND FORWARDING MESSAGE IN DATA COMMUNICATION NETWORK

TECHNICAL FIELD

The disclosure relates to the field of the message processing in a data communication network, in particularly to a method and a device for modifying and forwarding a message in a data communication network.

BACKGROUND

The emergence of services including Voice over Internet Protocol (VoIP), Internet Protocol Television (IPTV), The 3rd Generation Telecommunication (3G) technology, the Long Term Evolution (LTE) technology and the metro Ethernet Private line along with the rapid development of new services taking Internet Protocol (IP) as the core leads to not only a continue increase in demands for bandwidth but also a more meticulous user classification and a more effective and reliable data service management. The grouping of services urges the gradual evolution from access network, bearer network and core network device to the next generation network which takes packet switching as the core. The capability of a data chip in forwarding and processing various service messages, as an important function of the data chip, is continuously required to be improved and becomes more and more functionally complicated.

One of the major functions of the great number of access networks, bearer networks and core network devices existing in a communication network is to forward and process service messages, for example, an Optical Line Terminal (OLT) and an Optical Network Unit (ONU) in a Passive Optical Network (PON) and an Ethernet switch, a Broadband Remote Access Server (BRAS), a router and the like in a data communication network all need to forward and process various kinds of messages.

For a certain type of devices, as the earlier service processing requirement is relatively monotonous, the conventional message modification function generally aims at a part of fields in a message, for example, the Virtual Local Area Network (VLAN) priority mark in an Ethernet message head, a label tag in a Multi-Protocol Label Switching (MPLS) message or a head of an IP message and the like. However, as the demands for services increase continuously, to modify each independent field of different kinds of messages, in logic structure, it is designed to modify each field in a message in a parallel manner and modify each field using an independent logical processing unit.

Thus, it can be known that this existing design scheme brings problems in two aspects: aspect 1, as the increase in the functions of a chip is accompanied by the significant increase of the area and the power consumption of the chip, to balance the functions, the performance ad the cost of the chip, it is needed to decrease some functions of the chip, which is not a desirable choice for the designer of the chip; aspect 2: in order to meet some new demands or cope with changes in demands, a larger and larger amount of work needs to be done to add or modify logical codes on the basis of existing processing logic, and the post-maintenance of the codes becomes more and more complicated, leading to a great increase in both code maintenance time and code maintenance cost

SUMMARY

On that account, it is a main object of the disclosure to provide a method and a device for modifying and forwarding a message in a data communication network so as to free a designer from re-designing a chip for coping with the change in demands to greatly decrease the workload of design and reduce maintenance time, cost and complexity.

To this end, the technical solutions of the disclosure are as follows:

a method for modifying and forwarding a message in a data communication network is provide which includes: extracting description information of a message head as message descriptor information, and storing message fragments except the message descriptor information;

searching a pre-stored message modification description table for modification parameters used for a message modification according to the message descriptor information;

determining a needed message modification action according to the obtained modification parameters, and modifying the message fragments with a requirement of modification in groups according to types of actions; and distributing and reassembling the message fragments according to port numbers, re-splicing the message fragments into a complete message, and sending the message to an external interface in time sequence.

Preferably, the storing message fragments except the message descriptor information may include: storing the message except the message descriptor information in fragments by taking each 32 bytes as a group into a data slice cache.

Preferably, the message fragments with a requirement of modification may be message fragments of the message head.

Preferably, the distributing and reassembling the message fragments according to port numbers may include:

distributing the modified message fragments according to the port numbers; wherein the message fragments may include modified fragments of the message head and unmodified fragments of a message body; reassembling the fragments belonging to the same message head and those belonging to the same message body, and re-splicing the message fragments into a complete message.

Preferably, the message modification description table may include: a message modification action description table and a message modification content description table, wherein the message modification action description table may include message modification actions and action code information; the message modification actions may include data insertion, data deletion and data coverage actions; and the message modification content description table may include message modification fields and field code information.

Preferably, the modifying the message fragments with a requirement of modification in groups according to types of actions may include:

grouping the message fragments on which a data insertion modification needs to be performed into one group, and uniformly performing the data insertion modification on the group of message fragments;

grouping the message fragments on which a data deletion modification needs to be performed into one group, and uniformly performing the data deletion modification on the group of message fragments; and grouping the message fragments on which a data coverage modification needs to be performed into one group, and uniformly performing the data coverage modification on the group of message fragments.

A device for modifying and forwarding a message in a data communication network is also provided which includes: a descriptor extraction module, a searching table processing module, an editing module, a message distribution module and a message reassembling module, wherein the descriptor extraction module is configured to extract description information of a message head as message descriptor information, and to send the extracted message descriptor information to the searching table processing module;

the searching table processing module is configured to search a pre-stored message modification description table for modification parameters used for a message modification according to the message descriptor information, and to send the obtained modification parameters to the editing module;

the editing module is configured to determine a needed message modification action according to the obtained modification parameters, to modify message fragments with a requirement of modification in groups according to types of actions, and to send the modified message fragments and message fragments without a requirement of modification to the message distribution module;

the message distribution module is configured to distribute the message fragments according to port numbers, and to send the messages of the same port number to the message reassembling module of a corresponding port; and the message reassembling module is configured to reassemble the message fragments of the same port number, to re-splice the message fragments into a complete message, and to send the message to an external interface in time sequence.

Preferably, the device may further include: a data slice cache configured to store the message fragments sent from the descriptor extraction module; and accordingly, the descriptor extraction module may be further configured to send the message except the message descriptor information to the data slice cache.

Preferably, the editing module may include: an analysis unit, an insertion modification execution unit, a deletion modification execution unit, a coverage modification execution unit and an output control unit, wherein the analysis unit may be configured to determine a needed message modification action according to the obtained modification parameters, to group the message fragments with the requirement of modification according to the types of actions, to send the grouped message fragments to corresponding modification execution units for the message modification, and to directly send the message fragments without the requirement of modification to the output control unit;

the insertion modification execution unit may be configured to modify the message fragments on which a data insertion modification needs to be performed, and to send the modified message fragments to the output control unit;

the deletion modification execution unit may be configured to modify the message fragments on which a data deletion modification needs to be performed, and to send the modified message fragments to the output control unit;

the coverage modification execution unit may be configured to modify the message fragments on which a data coverage modification needs to be performed, and to send the modified message fragments to the output control unit; and the output control unit may be configured to receive the modified message fragments and unmodified message fragments, and to send the received message fragments to the message distribution module.

Preferably, the message modification description table may include a message modification action description table and a message modification content description table, wherein the message modification action description table may include message modification actions and action code information, the message modification actions may include data insertion, data deletion and data coverage actions; and the message modification content description table may include message modification fields and field code information.

According to the method and the device for modifying and forwarding a message in a data communication network provided herein, the description information of a message head is extracted as message descriptor information, and message fragments are stored except for the message descriptor information; a pre-stored message modification description table is searched for the modification parameters used for message modification according to the message descriptor information; a needed message modification action is determined according to the modification parameters obtained, the message fragments with a requirement of modification are modified in groups according to the types of actions; and the message fragments are distributed and reassembled according to port numbers, re-spliced into a complete message and sent to an external interface in time sequence. Thus, it can be known that by grouping message fragments with a requirement of modification according to the types of actions and modifying the message fragments in groups, the method and the device disclosed herein realize, in one module, the insertion, the deletion or the coverage at each field in various kinds of messages, freeing the maintainer from modifying logical codes on the basis of existing processing logic for coping with the change in demands; moreover, when there is an increase in the types of messages with a requirement of modification or the fields with a requirement of modification, the pre-stored message descriptor table is modified through an external interface to add, alter or delete message modification parameters to meet the demands for different kinds of services, thus freeing the designer from re-designing a chip to cope with the change in demands, greatly decreasing the workload of design and reducing maintenance time, cost and complexity.

DETAILED DESCRIPTION

The disclosure is described below in detail with reference to the drawings in conjunction with specific embodiments.

Figure 1:
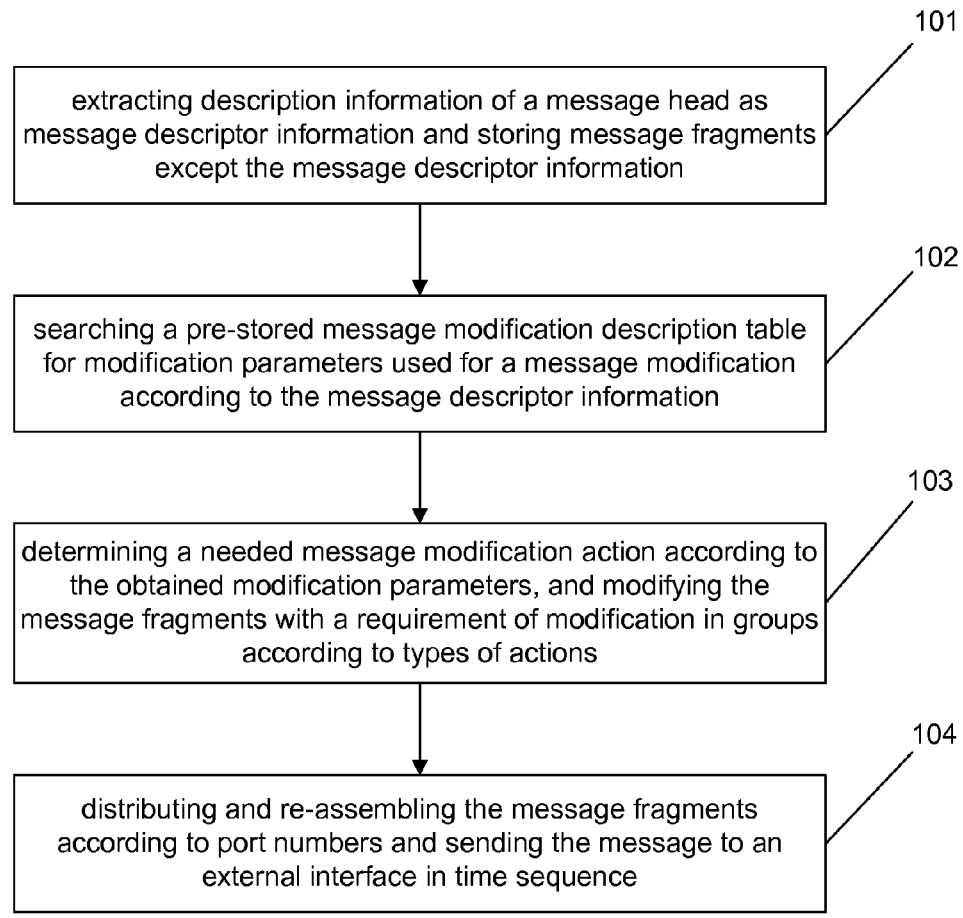
FIG. 1 is a flowchart schematically illustrating a method for modifying and forwarding a message in a data communication network according to an embodiment of the disclosure.

FIG. 1 is a flowchart schematically illustrating a method for modifying and forwarding a message in a data communication network according to an embodiment of the disclosure, as shown in FIG. 1, the method includes the following steps:

Step 101: extracting description information of a message head as message descriptor information, and storing message fragments except the message descriptor information;

here, the message descriptor information includes field information of a message with a requirement of modification and a modification action needed to be executed for the message, wherein the modification action needed to be executed for the message includes: insertion, deletion, coverage and other actions, that is, data insertion, data deletion, and data coverage; and data coverage refers to data rewriting.

In the embodiment, Table 1 is a table showing field information of a message with a requirement of modification according to an embodiment of the disclosure, as shown in Table 1, the main field information of the message with the requirement of modification includes: destination Media Access Control (MAC) address field information of MPLS layer (MPLS_DA), source MAC address field information of MPLS layer (MPLS_SA), private VLAN field information (Pvlan), section layer VLAN field information (Section_vlan), destination MAC address field information of Ethernet (ETH_DA), source MAC address field information of Ethernet (ETH_SA), operator VLAN field information (Svlan), client VLAN field information (Cvlan), type/length identification field information (Type/length), ring protection label field information (Frr_lable), tunnel label field information (Lsp_label), Pseudo-wire label field information (Pw_label), control word field information (ControlWord), Internet Protocol version 4 (IPV4) message head field information (Ipv4_head), Internet Protocol version 6 (IPV6) message head field information (Ipv6_head) and the like.

TABLE 1

Figure 2:
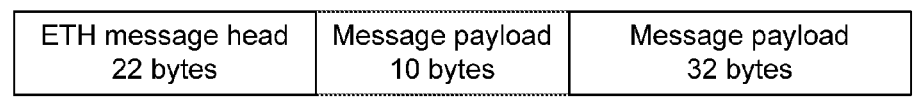
FIG. 2 is a schematic diagram illustrating a shift operation according to an embodiment of the disclosure.
Figure 2:
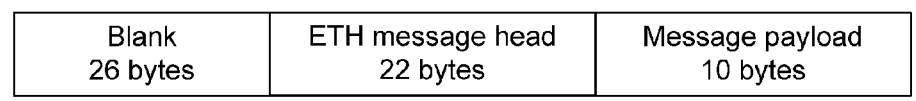
Figure 2:
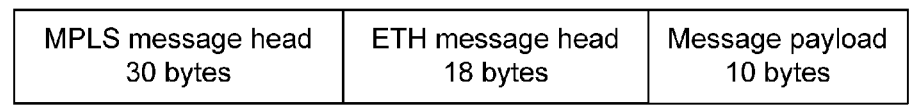

| Definition of field | Byte size | Information description |
| --- | --- | --- |
| MPLS_DA | 6 | Destination MAC address of MPLS layer |
| MPLS_SA | 6 | Source MAC address of MPLS layer |
| Pvlan | 4 | Private VLAN |
| Section_vlan | 4 | Section layer VLAN |
| ETH_DA | 6 | Destination MAC address of Ethernet |
| ETH_SA | 6 | Source MAC address of Ethernet |
| Svlan | 4 | Operator VLAN |
| Cvlan | 4 | Client VLAN |
| Type/length | 2 | Type/length identifier |
| Frr_label. | 4 | Ring protection label |
| Lsp_label. | 4 | Tunnel label |
| Pw_label | 4 | Pseudo-wire label |
| ControlWord | 4 | Control word |
| Ipv4_head | 20 | IPV4 message head |
| Ipv6_head | 8 | IPV6 message head | wherein, the storing the message fragments except the message descriptor information includes: storing the message except the message descriptor information in fragments by taking each 32 bytes as a group into a data slice cache; wherein the message fragments include message fragments of the message head and message fragments of a message body;

Step 102: searching a pre-stored message modification description table for modification parameters used for a message modification according to the message descriptor information;

here, the message modification description table includes: a message modification action description table and a message modification content description table; wherein the message modification action description table includes executing message modification actions and action code information, and the message modification content description table includes message modification fields and field code information;

wherein, the executing message modification actions refers to executing message insertion action, executing message deletion action and executing message coverage action;

in the embodiment, Table 2 is a table showing field information of executing message modification according to an embodiment of the disclosure, as shown in FIG. 2, the field information of executing message modification includes: modification rule field information Rule, modified layer field information Oploc, modification offset field information OpOffset, Insertion size field information ISize, deletion size field information Dsize, insertion data field information InsertData and the like.

TABLE 2

| Field name | Definition | Description |
| --- | --- | --- |
| Rule | Modification rule | insertion, deletion, coverage |
| Oploc | Modified layer | Position of modified field in message |
| OpOffset | Modification offset | Offset address of modified content |
| ISize | Insertion size | Size of inserted data |
| Dsize | Deletion length | Size of deleted data |
| InsertData | insertion data | Data inserted from designated position | specifically, a pre-stored message modification description table may be searched according to the message descriptor information, which includes: the pre-stored message modification description table is searched according to message modification action code information and message modification field code information, so as to obtain modification parameters needed for message modification;

the message modification description table pre-stored in a message modification table cache can be viewed or modified through an external processor interface;

Step 103: determining a needed message modification action according to the obtained modification parameters, and modifying the message fragments with a requirement of modification in groups according to types of actions;

here, the needed message modification action is determined according to a message modification action, that is, according to executing message insertion action, executing message deletion action and executing message coverage action, all the message fragments on which the executing message insertion action needs to be performed are classified into one category, the message fragments on which the executing message deletion action needs to be performed are classified into one category, and all the message fragments on which the executing message coverage action needs to be performed are classified into one category.

Here, before modifying the message fragments with the requirement of modification in groups according to the types of actions, the method further includes: reading the message fragments stored in the data slice cache, and modifying, according to the needed message modification action, the message fragments with the requirement of modification in groups according to the types of actions;

here, the modifying the message fragments with the requirement of modification in groups according to the types of the actions includes:

grouping the message fragments on which a data insertion modification needs to be performed into one group, and uniformly performing the data insertion modification on the group of message fragments;

grouping the message fragments on which a data deletion modification needs to be performed into one group, and uniformly performing the data deletion modification on the group of message fragments; and grouping the message fragments on which a data coverage modification needs to be performed into one group, and uniformly performing the data coverage modification on the group of message fragments.

It should be noted that the message fragments with the requirement of modification are merely message fragments of the message head, the message fragments of the message body need no modification, however, the message is wholly stored in the data slice cache in the form of message fragments except the message descriptor information, when the message is modified, the message fragments stored in the data slice cache are read so that the message fragments with the requirement of modification are sent to different modification execution units according to the types of actions to be modified, and those needing no modification are directly prepared for message distribution, and after the message fragments of the message head are modified, the message fragments are distributed and reassembled according to port numbers;

Step 104: distributing and re-assembling the message fragments according to port numbers, re-splicing the message fragments into a complete message, and sending the message to an external interface in time sequence.

here, the distributing and re-assembling the message fragments according to port numbers includes: distributing the modified message fragments according to the port numbers, wherein the message fragments include the modified fragments of the message head and unmodified fragments of the message body, reassembling the fragments belonging to the same message head and those belonging to the same message body, and re-splicing the message fragments into a complete message.

Specifically, as the message fragments received from each port are mutually interwoven, it is needed to separate message fragments according to port numbers, after the message fragments of the message head and those of the message body are reassembled, the message head needs to be reassembled with a corresponding message body to be re-spliced into a complete message.

As a data insertion operation, a data deletion operation or a data coverage operation may be performed when the message is modified, there may be blanks in the spliced message; to guarantee that the finally output message is a complete consecutive message, it is needed to shift fragments of the spliced message; by filling the blanks between message fragments through the shift operation, the finally spliced message is complete and consecutive; and the complete consecutive message is sent to an external interface in time sequence.

The specific shift rule is as follows: if the size of the message is increased after the message modification, then the original message payload should be wholly shifted towards lower bits to empty a space for accommodating the content increased from the message modification; and if the size of a message is decreased after the message modification, then the message payload should be wholly shifted towards higher bits to cover a blank data space, wherein the shift operation is performed based on that high bits are on the left and low bits are on the right in the deployment direction of a data bus.

FIG. 2 is a schematic diagram illustrating a shift operation according to an embodiment of the disclosure, FIG. 2(*a*) is a schematic diagram illustrating the structure of a message before the modification, as shown in FIG. 2(*a*), before being modified, the message includes a 22-byte Ethernet message head (Ethernet head), a 10-byte message payload and a 32-byte message payload; and the size of the message head generated after the message is modified according to the modification parameters obtained through searching table is 48 bytes, thus, it is needed to add 26 bytes on the basis of the former message head. According to the rule for a shift operation that high bits are on the left and low bits are on the right, the original message is wholly shifted right by 26 bytes, and the blank resulting from the shift in high bits are stored temporarily, as shown in FIG. 2(*b*).

FIG. 2(*c*) is a schematic diagram illustrating the structure of the message after the message is modified, four bytes are deleted from the head field of the Ethernet message and kept in high bits, then a blank of up to 30 bytes is generated in high bits, a 30-byte MPLS message head (MPLS head) field which needs to be added is filled to the blank in high bits, and the message payload is filled into low bits, thereby reassembling a new message head.

Figure 3:
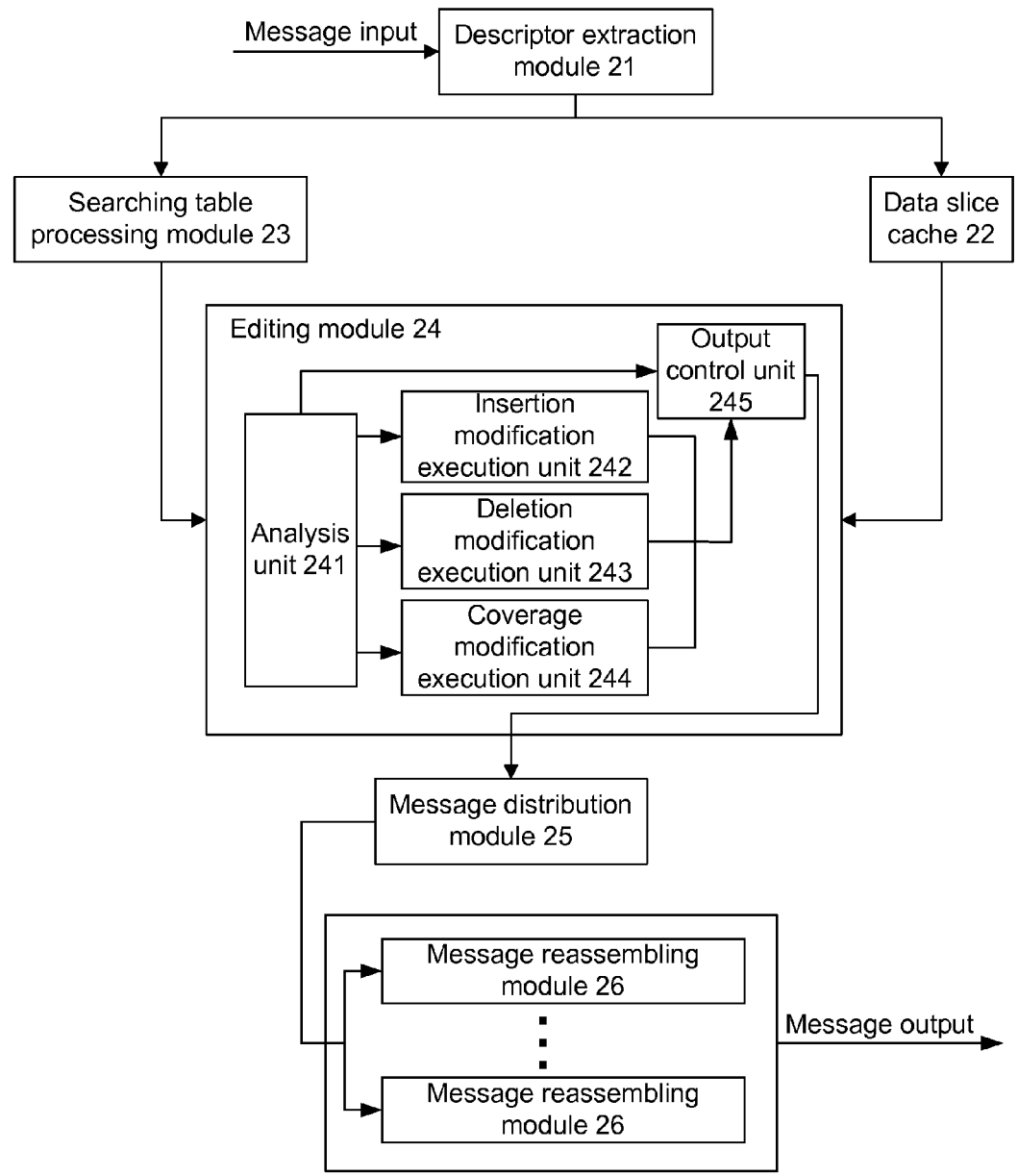
FIG. 3 is a schematic diagram illustrating the structure of a device for modifying and forwarding a message in a data communication network according to an embodiment of the disclosure.

To realize the above method, a device for modifying and forwarding a message in a data communication network is also provided in an embodiment of the disclosure, as shown in FIG. 3, the device includes: a descriptor extraction module 21, a searching table processing module 23, an editing module 24, a message distribution module 25 and a message reassembling module 26, wherein the descriptor extraction module 21 is configured to extract description information of a message head as message descriptor information, and to send the extracted message descriptor information to the searching table processing module 23;

the searching table processing module 23 is configured to search a pre-stored message modification description table for modification parameters used for a message modification according to the message descriptor information, and to send the obtained modification parameters to the editing module 24;

the editing module 24 is configured to determine a needed message modification action according to the obtained modification parameters, to modify message fragments with a requirement of modification in groups according to types of actions; and to send the modified message fragments and message fragments without a requirement of modification to the message distribution module 25;

the message distribution module 25 is configured to distribute the message fragments according to port numbers, and to send the messages of the same port number to the message reassembling module 26 of a corresponding port; and the message reassembling module 26 is configured to reassemble the message fragments of the same port number, to re-splice the message fragments into a complete message, and to send the message to an external interface in time sequence.

Preferably, the device further includes a data slice cache 22 configured to store the message fragments sent from the descriptor extraction module 21.

Accordingly, the descriptor extraction module 21 is further configured to send the message except the message descriptor information to the data slice cache 22.

Preferably, the editing module 24 includes: an analysis unit 241, an insertion modification execution unit 242, a deletion modification execution unit 243, a coverage modification execution unit 244 and an output control unit 245, wherein the analysis unit 241 is configured to determine a needed message modification action according to the obtained modification parameters, to group the message fragments with the requirement of modification according to the types of actions, to send the grouped message fragments to corresponding modification execution units for the message modification, and to directly send the message fragments without the requirement of modification to the output control unit 245;

the insertion modification execution unit 242 is configured to modify the message fragments on which a data insertion modification needs to be performed, and to send the modified message fragments to the output control unit 245;

the deletion modification execution unit 243 is configured to modify the message fragments on which a data deletion modification needs to be performed, and to send the modified message fragments to the output control unit 245;

the coverage modification execution unit 244 is configured to modify the message fragments on which a data coverage modification needs to be performed, and to send the modified message fragments to the output control unit 245; and the output control unit 245 is configured to receive the modified message fragments and unmodified message fragments, and to send the received message fragments to the message distribution module 25.

In the practical application, the device for modifying and forwarding a message in a data communication network can be realized by the server of an access network, a bearer network or a core network; the descriptor extraction module 21, the searching table processing module 23, the message distribution module 25, the message reassembling module 26 and the editing module 24 and sub-modules thereof, that is, the analysis unit 241, the insertion modification execution unit 242, the deletion modification execution unit 243, the coverage modification execution unit 244 and the output control unit 245, can all be realized by a Central Processing Unit (CPU), or a Digital Signal Processor (DSP) or a Field-Programmable Gate Array (FPGA) in the device in the practical application; and the data slice cache 22 in the device can be realized by a memory in the device in the practical application.

The mentioned above is only preferred embodiments of the disclosure but not limitation to the disclosure. Any modification, substitute or improvement devised without departing from the spirit and scope of the disclosure should fall within the protection range of the disclosure.

INDUSTRIAL APPLICATION

By grouping message fragments with a requirement of modification according to types of actions and modifying the message fragments in groups, the method and the device disclosed herein realize, in one module, the insertion, the deletion or the coverage at each field in various kinds of messages, freeing the maintainer from modifying logical codes on the basis of existing processing logic for coping with the change in demands; moreover, when there is an increase in the types of messages with a requirement of modification or the fields with a requirement of modification, a pre-stored message descriptor table is modified through an external interface to add, alter or delete message modification parameters to meet the demands for different kinds of services, thus freeing the designer from re-designing a chip to cope with the change in demands, greatly decreasing the workload of design and reducing maintenance time, cost and complexity.

What is claimed is:

1. A method for modifying and forwarding a message in a data communication network, comprising:
receiving, by a server in an access network, a bearer network or a core network, a message from a device;
extracting, by the server, description information of a message head in the message as message descriptor information,
storing, by the server, message fragments except the message descriptor information;
searching, by the server, a pre-stored message modification description table for modification parameters used for a message modification according to the message descriptor information;
determining, by the server, a needed message modification action according to the obtained modification parameters,
modifying, by the server, the message fragments with a requirement of modification in groups according to types of actions;
distributing, by the server, and reassembling the message fragments according to port numbers,
re-splicing, by the server, the message fragments into a complete message, and
sending, by the server, the message to an external interface in time sequence;
wherein the message modification description table comprises: a message modification action description table and a message modification content description table, wherein
the message modification action description table comprises message modification actions and action code information; the message modification actions comprise data insertion, data deletion and data coverage actions; and the message modification content description table comprises message modification fields and field code information;
wherein the modifying, by the server, the message fragments with a requirement of modification in groups according to types of actions comprises:
grouping, by the server, the message fragments on which a data insertion modification needs to be performed into one group, and uniformly performing the data insertion modification on the group of message fragments;
grouping, by the server, the message fragments on which a data deletion modification needs to be performed into one group, and uniformly performing the data deletion modification on the group of message fragments; and
grouping, by the server, the message fragments on which a data coverage modification needs to be performed into one group, and uniformly performing the data coverage modification on the group of message fragments.

2. The method according to claim 1, wherein the storing, by the server, message fragments except the message descriptor information comprises: storing, by the server, the message except the message descriptor information in fragments by taking each 32 bytes as a group into a data slice cache.

3. The method according to claim 2, wherein the distributing and reassembling, by the server, the message fragments according to port numbers comprises:
distributing, by the server, the modified message fragments according to the port numbers; wherein the message fragments comprise modified fragments of the message head and unmodified fragments of a message body;

reassembling, by the server, the fragments belonging to the same message head and those belonging to the same message body, and re-splicing, by the server, the message fragments into a complete message.

4. The method according to claim 1, wherein the message fragments with a requirement of modification are message fragments of the message head.

5. The method according to claim 4, wherein the distributing and reassembling, by the server, the message fragments according to port numbers comprises:

distributing, by the server, the modified message fragments according to the port numbers; wherein the message fragments comprise modified fragments of the message head and unmodified fragments of a message body;

reassembling, by the server, the fragments belonging to the same message head and those belonging to the same message body, and re-splicing, by the server, the message fragments into a complete message.

6. The method according to claim 1 wherein the distributing and reassembling, by the server, the message fragments according to port numbers comprises:

distributing, by the server, the modified message fragments according to the port numbers; wherein the message fragments comprise modified fragments of the message head and unmodified fragments of a message body;

reassembling, by the server, the fragments belonging to the same message head and those belonging to the same message body, and re-splicing, by the server, the message fragments into a complete message.

7. A device for modifying and forwarding a message in a data communication network, comprising a processor which is configured to implement: a descriptor extraction module, a searching table processing module, an editing module, a message distribution module and a message reassembling module, wherein the descriptor extraction module is configured to receive a message from a device and extract description information of a message head in the message as message descriptor information, and to send the extracted message descriptor information to the searching table processing module;

the searching table processing module is configured to search a pre-stored message modification description table for modification parameters used for a message modification according to the message descriptor information, and to send the obtained modification parameters to the editing module;

the editing module is configured to determine a needed message modification action according to the obtained modification parameters, to modify message fragments with a requirement of modification in groups according to types of actions, and to send the modified message fragments and message fragments without a requirement of modification to the message distribution module;

the message distribution module is configured to distribute the message fragments according to port numbers, and to send the messages of the same port number to the message reassembling module of a corresponding port; and the message reassembling module is configured to reassemble the message fragments of the same port number, to re-splice the message fragments into a complete message, and to send the message to an external interface in time sequence;

wherein the editing module comprises: an analysis unit, an insertion modification execution unit, a deletion modification execution unit, a coverage modification execution unit and an output control unit, wherein the analysis unit is configured to determine a needed message modification action according to the obtained modification parameters, to group the message fragments with the requirement of modification according to the types of actions, to send the grouped message fragments to corresponding modification execution units for the message modification, and to directly send the message fragments without the requirement of modification to the output control unit;

the insertion modification execution unit is configured to modify the message fragments on which a data insertion modification needs to be performed, and to send the modified message fragments to the output control unit;

the deletion modification execution unit is configured to modify the message fragments on which a data deletion modification needs to be performed, and to send the modified message fragments to the output control unit;

the coverage modification execution unit is configured to modify the message fragments on which a data coverage modification needs to be performed, and to send the modified message fragments to the output control unit; and the output control unit is configured to receive the modified message fragments and unmodified message fragments, and to send the received message fragments to the message distribution module.

8. The device according to claim 7, further comprising: a data slice cache configured to store the message fragments sent from the descriptor extraction module; and accordingly, the descriptor extraction module is further configured to send the message except the message descriptor information to the data slice cache.

9. The device according to claim 7, wherein the message modification description table comprises a message modification action description table and a message modification content description table, wherein the message modification action description table comprises message modification actions and action code information, the message modification actions comprise data insertion, data deletion and data coverage actions; and the message modification content description table comprises message modification fields and field code information.

* * * * *